United States Patent
Okanobu

(10) Patent No.: US 7,330,707 B2
(45) Date of Patent: Feb. 12, 2008

(54) HETRODYNE RECEIVER AND IC

(75) Inventor: Taiwa Okanobu, Tokyo (JP)

(73) Assignee: Sony Corporation, Tokyo (JP)

( * ) Notice: Subject to any disclaimer, the term of this patent is extended or adjusted under 35 U.S.C. 154(b) by 635 days.

(21) Appl. No.: 10/416,812

(22) PCT Filed: Sep. 2, 2002

(86) PCT No.: PCT/JP02/08870

§ 371 (c)(1),
(2), (4) Date: May 5, 2003

(87) PCT Pub. No.: WO03/023984

PCT Pub. Date: Mar. 20, 2003

(65) Prior Publication Data
US 2004/0014442 A1 Jan. 22, 2004

(30) Foreign Application Priority Data
Sep. 5, 2001 (JP) .............................. 2001-268253

(51) Int. Cl.
H04B 7/08 (2006.01)
(52) U.S. Cl. ...................... 455/140; 455/133; 455/134; 455/135; 455/139; 455/141; 455/161.1; 455/161.2; 455/161.3
(58) Field of Classification Search ................ 455/133, 455/134, 135, 139, 140, 141, 161.1, 161.2, 455/161.3
See application file for complete search history.

(56) References Cited

U.S. PATENT DOCUMENTS

| 4,850,038 | A | * | 7/1989 | Shibata et al. ............... 455/315 |
| 5,498,998 | A | * | 3/1996 | Gehrke et al. ................ 331/17 |
| 5,809,407 | A | * | 9/1998 | Kasperkovitz et al. ... 455/184.1 |
| 6,144,845 | A | * | 11/2000 | Durec ........................ 455/285 |
| 6,353,642 | B1 | * | 3/2002 | Asahara et al. ............. 375/344 |
| 6,590,871 | B1 | * | 7/2003 | Adachi ....................... 370/307 |
| 6,950,474 | B1 | * | 9/2005 | Sudo .......................... 375/260 |
| 2002/0075971 | A1 | * | 6/2002 | Cowley et al. ............. 375/316 |
| 2003/0135852 | A1 | * | 7/2003 | Kamemoto .................. 725/32 |

FOREIGN PATENT DOCUMENTS

JP 55-12536 1/1980

(Continued)

OTHER PUBLICATIONS

Behzad Rasavi, "RF Microelectronics", Transceiver Architectures, Chapter 5, pp. 138-165.

(Continued)

Primary Examiner—Duc M. Nguyen
Assistant Examiner—Justin Lee
(74) Attorney, Agent, or Firm—Wolfe, Greenfield & Sacks, P.C.

(57) ABSTRACT

In a heterodyne receiver, the effect of an image interference signal that occurs in a case where a low intermediate frequency is used is alleviated. Circuits (12I), (12Q), (13I), (13Q), and (14) are provided to switch a heterodyne system between an upper heterodyne system and a lower heterodyne system. The switching circuits (12I) to (14) switch the heterodyne system into one of the upper heterodyne system and the lower heterodyne system with less image interference on the basis of each reception frequency.

9 Claims, 9 Drawing Sheets

FOREIGN PATENT DOCUMENTS

| | | |
|---|---|---|
| JP | 55-012536 Y2 | 3/1980 |
| JP | 3-210825 | 9/1991 |
| JP | 03-210825 A | 9/1991 |
| JP | 5-48985 | 2/1993 |
| JP | 7-231273 | 8/1995 |
| JP | 7-250005 | 9/1995 |
| JP | 07-250005 A | 9/1995 |
| JP | 7-321684 | 12/1995 |
| JP | 07-321684 A | 12/1995 |
| JP | 11-55142 | 2/1999 |
| JP | 11-355168 | 12/1999 |
| JP | 2000-174652 A | 6/2000 |
| JP | 2001-186039 A | 7/2001 |
| JP | 2001-211136 A | 8/2001 |

OTHER PUBLICATIONS

Nikkei Electronics, No. 784, Dec. 4, 2000, p. 31.

* cited by examiner

HETRODYNE RECEIVER AND IC

TECHNICAL FIELD

The present invention relates to a heterodyne receiver and an IC (integrated circuit).

BACKGROUND ART

In Japan, ISDB-TSB (Integrated Services Digital Broadcasting for Terrestrial Sound Broadcasting) is used for terrestrial digital audio broadcasting. In ISDB-TSB, in which a plurality of sets of digital data, such as digital audio data, are simultaneously broadcast, a transmission band as wide as one channel for television broadcasting is divided into thirteen bands (OFDM (orthogonal frequency division multiplex) segments), and information to be transmitted is assigned to each of the OFDM segments. (OFDM segments will hereinafter be referred to simply as "segments".)

Transmission parameters in ISDB-TSB include:
Segment bandwidth: 432 kHz
Transmission bandwidth: 5,616 kHz (for 13 segments)
Modulation: OFDM
Carrier modulation: DQPSK (differential quadrature phase shift keying), etc.
Multiplexing: MPEG (Motion Picture Image Coding Experts Group)-2 system
Audio coding: AAC (MPEG-2/Advanced Audio Coding)
ISDB-TSB broadcasting uses one or three segments. ISDB-TSB broadcasting is planned to use a vacant channel of the current VHF (Very High Frequency) band of television broadcasting.

Part A of FIG. 9 shows an example of frequency allocation for segments, in which an (m−1)-th channel and an (m+1)-th channel are used for television broadcasting while an m-th channel is a vacant channel in television broadcasting. The m-th channel is used for ISDB-TSB broadcasting, and thirteen segments #1 to #13 are transmitted in conjunction using the m-th channel.

In this case, the bandwidth occupied by the segments #1 to #13 is 5,616 kHz (=432 kHZ×13). Thus, in the frequency range of the m-th channel, signals are absent in one of the frequency range lower than the segment #1 and the frequency range higher than the segment #13, or absent in both as shown in part A of FIG. 9.

In a superheterodyne receiver, selectivity characteristics can be readily improved by lowering the intermediate frequency. Accordingly, it is considered to lower the intermediate frequency in an ISDB-TSB receiver. However, lowering the intermediate frequency causes image frequencies to be included in a reception band.

Parts B and C of FIG. 9 show image frequencies in an ISDB-TSB receiver with an intermediate frequency of 500 kHz. As shown in part B of FIG. 9, when receiving a signal of the segment #1, the frequency of a local oscillation signal SLO is set to a frequency that is higher than the center frequency of the segment #1 by 500 kHz. In that case, image frequencies occur in a frequency range shown as hatched in part B of FIG. 9, that is, a frequency range having a width of 432 kHz, centered at a frequency higher than the center frequency of the segment #1 by 1 MHz, which is twice the intermediate frequency. Thus, when receiving a signal of the segment #1, parts of signals of the segments #3 and #4 in the same m-th channel become image interference signals.

Also, as shown in part C of FIG. 9, when receiving a signal of the segment #13, the frequency of the local oscillation signal SLO is set to a frequency that is higher than the center frequency of the segment #13 by 500 kHz. In that case, image frequencies occur in a frequency range shown as hatched in part C of FIG. 9, that is, a frequency range having a width of 432 kHz, centered at a frequency that is higher than the center frequency of the segment #1 by 1 MHz. Thus, when receiving a signal of the segment #13, part of a video carrier signal in the (m+1)-th channel becomes an image interference signal.

Similarly, when receiving signals of the segments #2 to #12, image frequencies occur in a frequency range having a width of 432 kHz, centered at a frequency that is higher than the center frequency of a segment being received by 1 MHz. Thus, when receiving signals of the segments #2 to #12, parts of signals of other segments in the same m-th channel, or part of a video carrier signal in the (m+1)-th channel become image interference signals.

Generally, if an image interference signal is included in a reception signal, a circuit for removing or canceling the image interference signal is provided to improve characteristics relating to image interference. For example, an antenna tuning circuit is provided to remove the image interference signal, or a dual conversion system (double superheterodyne system) is used to remove the image interference signal by a first intermediate frequency filter. Alternatively, a signal having a phase opposite to that of the image interference signal is formed to thereby cancel the image interference signal.

However, in order to remove the image interference signal by the antenna tuning circuit or the first intermediate frequency filter, additional components must be externally attached to an IC, or the circuitry scale must be expanded, resulting in an increased cost. Furthermore, in the case of VHF band as described above, and if image frequencies occur in proximity to the frequencies of a target segment, considerably sharp bandpass characteristics are required for the antenna tuning circuit or the first intermediate frequency filter, which also leads to an increased cost.

When the image interference signal is cancelled using a signal having an opposite phase, high precision is required in the balance of the circuitry, and usually an image attenuation ratio on the order of 40 dB is a maximum value achievable. Thus, if the level of the image interference signal is high, part of the image interference signal remain uncancelled and is output as an interference signal.

FIG. 10 shows a case where three segments are used for ISDB-TSB broadcasting, and it shows a frequency relationship assuming an intermediate frequency of 1 MHz. Parts A to C in FIG. 10 correspond to parts A to C in FIG. 9.

As shown in FIG. 10, also when receiving signals of the three segments, part of signals of other segments in the same m-th channel, or part of a video carrier signal in the (m+1)-th channel become image interference signals. Thus, also in this case, image interference occurs, and an increased cost is needed in order to avoid the image interference.

The present invention has been made in order to overcome the problems described above.

DISCLOSURE OF INVENTION

According to the present invention, for example:

A heterodyne receiver with a low intermediate frequency, comprises:

a reception circuit that can be selectively switched into an upper heterodyne system and a lower heterodyne system, and a control circuit for controlling the reception circuit to switch the reception circuit into the upper heterodyne system and the lower heterodyne system in turn and to then switch the reception circuit into a system with less image interference in output signals of the reception circuit in the respective cases, wherein the reception circuit is switched into one of the upper heterodyne system and the lower heterodyne system with less image interference on the basis of each reception frequency.

Accordingly, the heterodyne system is changed in accordance with the magnitude of an image interference signal, serving to achieve appropriate reception.

BEST MODE FOR CARRYING OUT THE INVENTION

Figure 9:
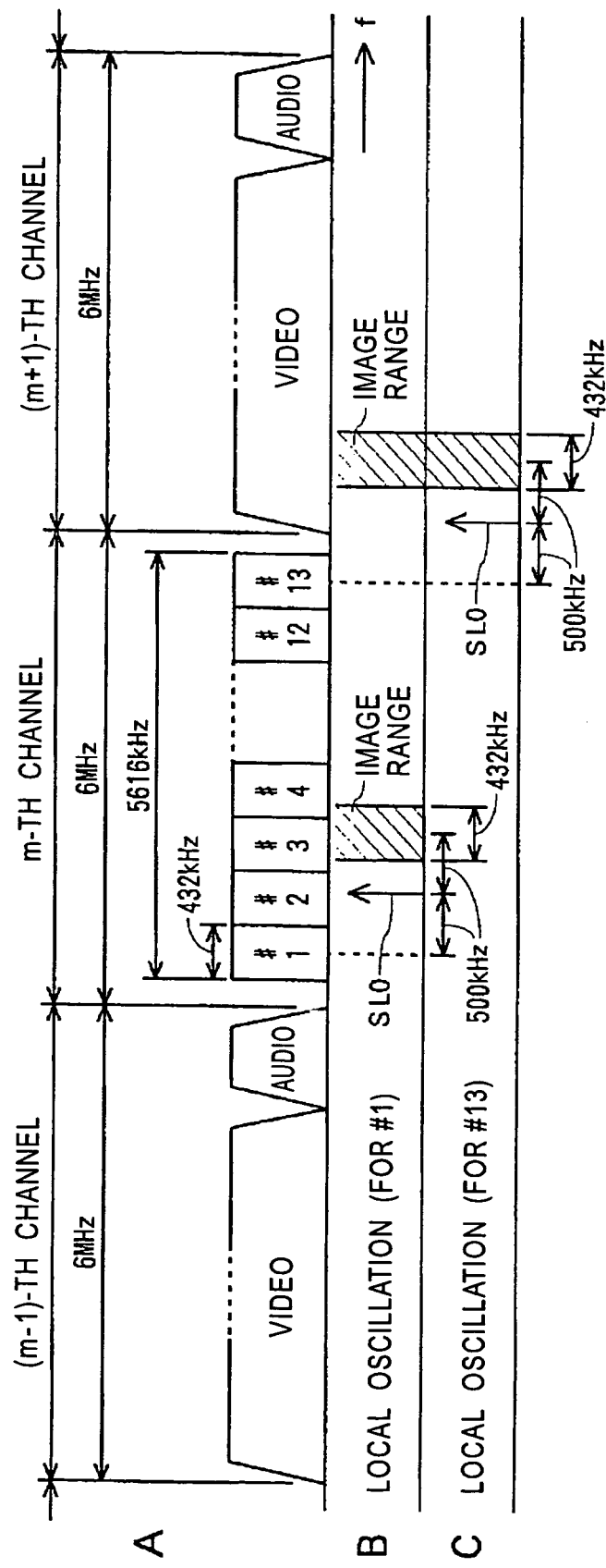
FIG. 9 is a frequency spectrum chart for explaining the present invention.
Figure 10:
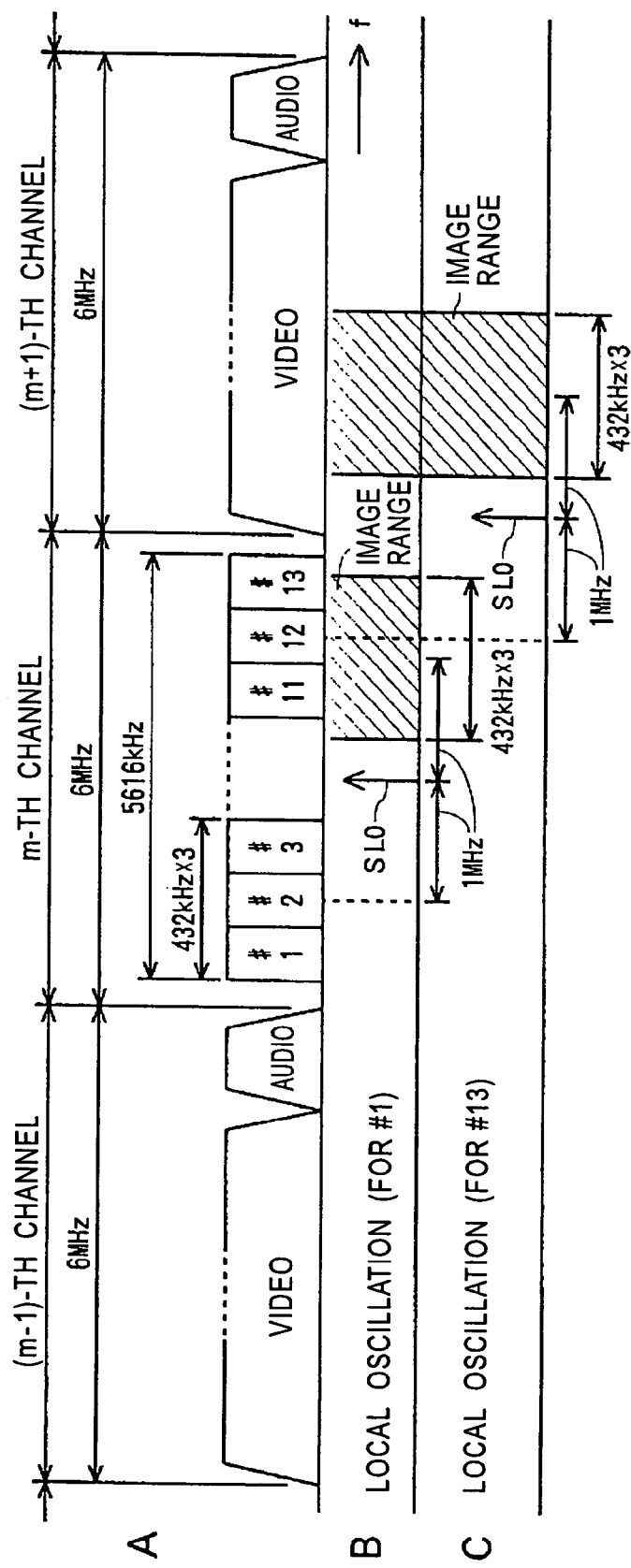
FIG. 10 is a frequency spectrum chart for explaining the present invention.

When an ISDB-TSB receiver receives a signal of a segment, if an analog signal (e.g., a video carrier signal) becomes as an image interference signal as shown in part C of FIG. 9, an image interference rejection ratio on the order of 40 dB is not sufficient, as described earlier. However, it has been verified by experiments, etc. that if a digital signal (e.g., a signal of a segment) becomes as an image interference signal, an image interference rejection ratio of 28 dB or larger suffices to normally receive a signal of a target segment without a problem.

In view of the above, according to the present invention, in the case of an ISDB-TSB receiver, when receiving a signal of a segment, heterodyne system is switched between an upper heterodyne system and a lower heterodyne system so that an analog signal that causes image interference will not fall within an image frequency range.

Figure 1:
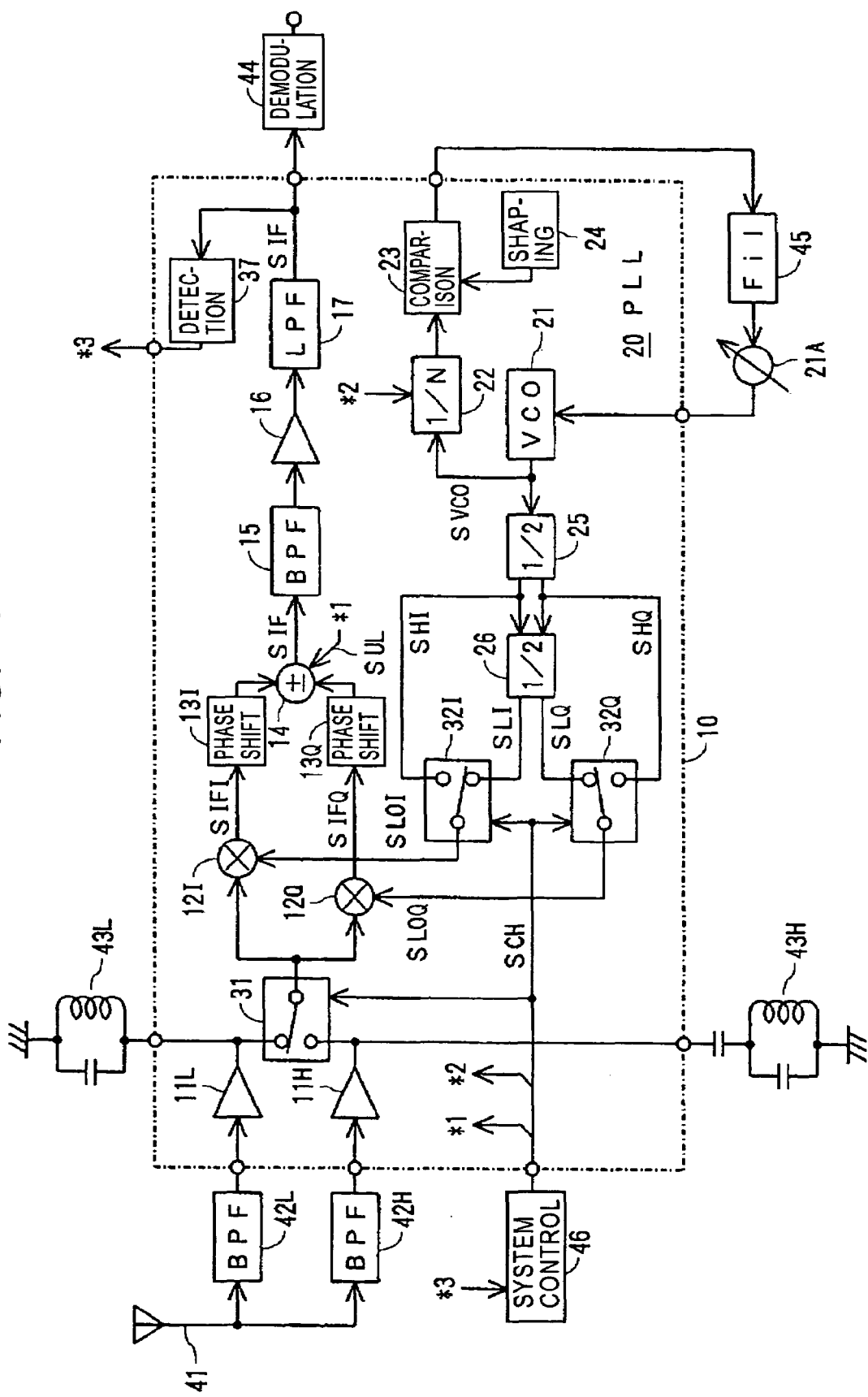
FIG. 1 is a system diagram showing an embodiment of the present invention.

FIG. 1 shows an example of an ISDB-TSB reception circuit according to the present invention. In this example, a signal of a segment in a channel, arbitrarily selected from channels of ISDB-TSB broadcasting, is received. A portion 10 surrounded by a dotted line in FIG. 1 is implemented in the form of a single-chip IC.

A signal of an ISDB-TSB broadcasting wave is received by an antenna 41, and the received signal is fed to bandpass filters 42L and 42H implemented by, for example, SAW (surface acoustic wave) filters. In this example, the bandpass filter 42L passes a low band (the first to third channels, i.e., 90 MHz to 108 MHz), while the bandpass filter 42H passes a high band (the fourth to the twelfth channel, i.e., 170 MHz to 222 MHz). Thus, signals of ISDB-TSB broadcasting waves (and signals of television broadcasting waves) in the low band and in the high band are output from the filters 42L and 42H.

Signals output from these filters 42L and 42H are fed to a switching circuit 31 via high-frequency amplifiers 11L and 11H. Switching of the switching circuit 31 is controlled according to a control signal SCH fed from a microcomputer 46 for controlling the system so that a signal output from the bandpass filter 42L will be output during reception of the low band while a signal output from the bandpass filter 42H will be output during reception of the high band. Output terminals of the amplifiers 11L and 11H are connected to interstage tuning circuits 43L and 43H that are tuned to the low band and the high band, respectively.

Thus, a signal of an ISDB-TSB broadcasting wave in the low band or the high band is selected and output from the switching circuit 31, and the output signal of the ISDB-TSB broadcasting wave is fed to mixer circuits 12I and 12Q.

Furthermore, a VCO (voltage controlled oscillator) 21 forms an oscillation signal SVCO having a specified frequency. The VCO 21 is used to form a local oscillation signal, and is part of a PLL (phase locked loop) 20. More specifically, the oscillation signal SVCO formed by the VCO 21 is fed to a variable frequency-divider circuit 22 and frequency-divided to form a signal having a frequency of 1/N, and the frequency-divided signal is fed to a phase comparator circuit 23. Furthermore, an alternating signal having a stable frequency is output from a shaping circuit 24, and the signal is fed to the phase comparator circuit 23 as a reference signal.

A comparison output of the phase comparator circuit 23 is fed to a loop filter 45, which outputs a DC voltage whose level changes in accordance with the phase difference between the signal output from the variable frequency-divider circuit 22 and the signal output from the shaping circuit 24. The DC voltage is fed to an oscillation circuit 21A of the VCO 21 as a voltage for controlling the oscillation frequency.

The oscillation frequency of the VCO 21 is N times the frequency of the signal output from the shaping circuit 24. Thus, the frequency of the oscillation signal SVCO of the VCO 21 can be changed by controlling the frequency division ratio N by the microcomputer 46.

The oscillation signal SVCO of the VCO 21 is fed to a frequency divider circuit 25 and frequency-divided into frequency-divided signals SHI and SHQ having a frequency reduced to one half and having phases different by 90° relative to each other. These signals SHI and SHQ are fed to switching circuits 32I and 32Q. Furthermore, the frequency-divided signals SHI and SHQ are fed to a frequency divider circuit 26 and frequency-divided into frequency-divided signals SLI and SLQ having a frequency reduced to one half and having phases different by 90° relative to each other. These signals SLI and SLQ are fed to the switching circuits 32I and 32Q.

Switching of the switching circuits 32I and 32Q is controlled according to the control signal SCH in conjunction with the switching circuit 31 so that the signals SLI and SLQ will be output and fed to the mixer circuits 12I and 12Q as local oscillation signals SLOI and SLOQ during reception of the low band while the signals SHI and SHQ will be output and fed to the mixer circuits 12I and 12Q as local oscillations signals SLOI and SLOQ during reception of the high band.

Figure 2A:
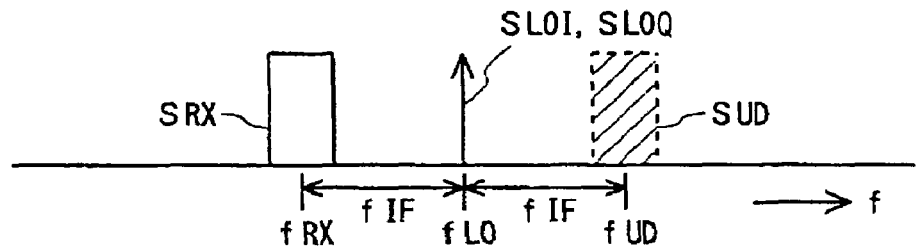
FIGS. 2A and 2B are frequency spectrum charts for explaining the present invention.

Now, as shown in FIG. 2A, let it be assumed that:

SRX: Signal of a desired segment to be received (desired reception signal)

SUD: Image interference signal

Furthermore, for simplicity, let it be assumed that:

$$SRX = ERX \cdot \sin \omega RXt$$

ERX: Amplitude of the desired reception signal SRX
$\omega RX = 2\pi fRX$
fRX: Center frequency of the desired reception signal SRX (center frequency of that segment)

$$SUD = EUD \cdot \sin \omega UDt$$

EUD: Amplitude of the image interference signal SUD
$\omega UD = 2\pi fUD$
fUD: Center frequency of the image interference signal SUD As described with reference to FIG. 9, the image interference signal SUD is mainly a signal of a television broadcasting wave (video carrier signal) or a signal of an ISDB-TSB broadcasting wave (signal of another segment in the same channel).

As for local oscillation signals SLOI and SLOQ, let it be assumed that:

$$SLOI = ELO \cdot \sin \omega LOt$$

$$SLOQ = ELO \cdot \cos \omega LOt$$

ELO: Amplitude of the signals SLOI and SLOQ
$\omega LO = 2\pi fLO$
fLO: Frequency of the signals SLOI and SLOQ
Assuming that:

$$\omega IF = 2\pi fIF$$

fIF: Intermediate frequency, for example, 500 kHz in the case of the upper heterodyne system, as shown in FIG. 2A, $$fRX = fLO - fIF$$

$$fUD = fLO + fIF$$

Thus, the mixer circuits 12I and 12Q output signals SIFI and SIFQ expressed as follows:

$$SIFI = (SRX + SUD) \times SLOI$$
$$= ERX \cdot \sin\omega RXt \times ELO \cdot \sin\omega LOt +$$
$$EUD \cdot \sin\omega UDt \times ELO \cdot \sin\omega LOt$$
$$= \alpha\{\cos(\omega RX - \omega LO)t - \cos(\omega RX + \omega LO)t\} +$$
$$\beta\{\cos(\omega UD - \omega LO)t - \cos(\omega UD + \omega LO)t\}$$
$$SIFQ = (SRX + SUD) \times SLOQ$$
$$= ERX \cdot \sin\omega RXt \times ELO \cdot \cos\omega LOt +$$
$$EUD \cdot \sin\omega UDt \times ELO \cdot \cos\omega LOt$$
$$= \alpha\{\sin(\omega RX + \omega LO)t + \sin(\omega RX - \omega LO)t\} +$$
$$\beta\{\sin(\omega UD + \omega LO)t + \sin(\omega UD - \omega LO)t\}$$
$$\alpha = ERX \cdot ELO/2$$
$$\beta = EUD \cdot ELO/2$$

These signals SIFI and SIFQ are output.

As will be described later, of the signals SIFI and SIFQ, signal components having angular frequencies of $(\omega RX - \omega LO)$ and $(\omega UD - \omega LO)$ are extracted as intermediate frequency signals by an intermediate frequency filter, and signal components having angular frequencies of $(\omega RX + \omega LO)$ and $(\omega UD + \omega LO)$ are removed by the intermediate frequency filter. For simplicity, the signal components that are removed, having angular frequencies of $(\omega RX + \omega LO)$ and $(\omega UD + \omega LO)$, will be disregarded. Then, the above equations can be rearranged as:

$$SIFI = \alpha \cdot \cos(\omega RX - \omega LO)t + \beta \cdot \cos(\omega UD - \omega LO)t$$

$$SIFQ = \alpha \cdot \sin(\omega RX - \omega LO)t + \beta \cdot \sin(\omega UD - \omega LO)t$$

When a signal of a desired segment is being received by an upper heterodyne system, the frequency relationship shown in FIG. 2A holds, so that:

$$SIFI = \alpha \cdot \cos(\omega RX - \omega LO)t + \beta \cdot \cos(\omega UD - \omega LO)t \quad (1)$$
$$= \alpha \cdot \cos\omega IFt + \beta \cdot \cos\omega IFt$$

$$SIFQ = \alpha \cdot \sin(\omega RX - \omega LO)t + \beta \cdot \sin(\omega UD - \omega LO)t \quad (2)$$
$$= -\alpha \cdot \sin\omega IFt + \beta \cdot \sin\omega IFt$$

These signals SIFI and SIFQ are fed to phase-shift circuits 13I and 13Q. The phase-shift circuits 13I and 13Q are, for example, active filters implemented by capacitors, resistors, and operational amplifiers. The phase-shift circuit 13I shifts the phase of the signal SIFI by a value φ (φ is an arbitrary value), and the phase-shift circuit 13Q shifts the phase of the signal SIFQ by a value (φ−90°).

The phase-shift circuits 13I and 13Q thus delays the phase of the signal SIFQ by 90° relative to that of the signal SIFI:

$$SIFI = \alpha \cdot \cos\omega IFt + \beta \cdot \cos\omega IFt \quad (3)$$

$$SIFQ = -\alpha \cdot \sin(\omega IFt - 90°) + \beta \cdot \sin(\omega IFt - 90°) \quad (4)$$
$$= \alpha \cdot \cos\omega IFt - \beta \cdot \cos\omega IFt$$

Thus, between the signal SIFI and the signal SIFQ, the signal components α·cos ωIFt are in phase with each other, while the signal components β·cos ωIFt are in mutually opposite phases.

These signals SIFI and SIFQ are fed to an adder-subtractor circuit 14, and a control signal SUL is also fed to the adder-subtractor circuit 14 from the microcomputer 46. The control signal SUL controls the operation of the adder-subtractor circuit 14 so that the adder-subtractor circuit 14 operates as an adder circuit when a signal of a desired segment is received by the upper heterodyne system while the adder-subtractor circuit 14 operates as a subtractor circuit when a signal of a desired segment is received by the lower heterodyne system.

In this case, a signal of a desired segment is received by the upper heterodyne system. Thus, the adder-subtractor circuit 14 performs addition, outputting a signal SIF expressed as follows:

$$SIF = SIFI + SIFQ$$
$$= 2\alpha \cdot \cos\omega Ift$$
$$= ELO \cdot ERX \cdot \cos\omega IFt$$

The output signal SIF is an intermediate frequency signal obtained when the signal SRX is received by the upper heterodyne system.

The intermediate frequency signal SIF is fed to an intermediate-frequency bandpass filter 15, which extracts a target frequency component and removes unwanted frequency components. At this time, the filter 15 removes the signal components having angular frequencies of (ωRX+ωLO) and (ωUD+ωLO), described earlier.

Then, the intermediate frequency signal SIF from the filter 15 is output from the IC 10 after passing an AGC (automatic gain control) amplifier 16 and a low-pass filter 17, and then fed to the demodulation circuit 44, which demodulates a digital audio signal of a target program.

Thus, according to the arrangement described above, a signal of a desired segment can be received by switching the switching circuits 31, 32I, and 32Q in accordance with the channel to which the segment to be received belongs, and by changing the oscillation frequency of the VCO 21 in accordance with the segment to be received.

At that time, the mixer circuits 12I and 12Q, the phase-shift circuits 13I and 13Q, and the adder-subtractor circuit 14 cancel the image interference signal SUD. However, as described earlier, high precision is required in the balance of the circuits in order to achieve a sufficient image interference rejection ratio, and usually a maximum value achievable is on the order of 40 dB. If an analog signal (e.g., a video carrier signal) becomes an image interference signal, for example, as shown in part C of FIG. 9, an image interference rejection ratio on the order of 40 dB is not sufficient.

Thus, according to the present invention, if an analog signal falls within a range of image frequencies, for example, as shown in part C of FIG. 9, the heterodyne system is switched from the upper heterodyne system to the lower heterodyne system. (It is to be understood that, at this time, in accordance with the switching of the heterodyne system, the frequency division ratio N of the variable frequency-divider circuit 22 is changed so that the oscillation frequency of the VCO 21 will be shifted by twice the intermediate frequency fIF.)

Figure 2B:
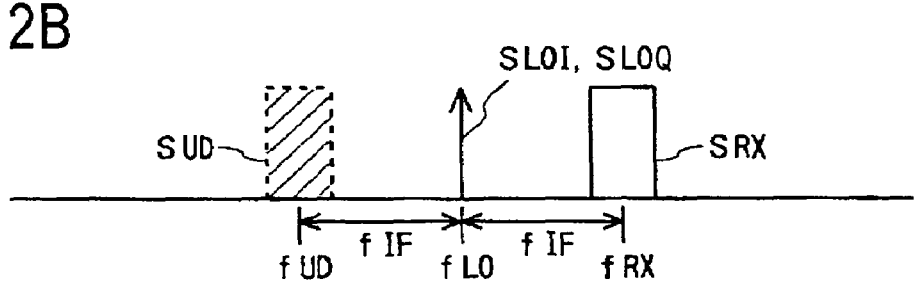

That is, when a signal of a desired segment is received by the lower heterodyne system, as shown in FIG. 2B, the following frequency relationship holds:

$$fRX = fLO + fIF$$

$$fUD = fLO - fIF$$

Thus, from equations (1) and (2), the signals SIFI and SIFQ can be expressed as:

$$SIFI = \alpha \cdot \cos(\omega RX - \omega LO)t + \beta \cdot \cos(\omega UD - \omega LO)t$$
$$= \alpha \cdot \cos\omega IFt + \beta \cdot \cos\omega IFt$$
$$SIFQ = \alpha \cdot \sin(\omega RX - \omega LO)t + \beta \cdot \sin(\omega UD - \omega LO)t$$
$$= \alpha \cdot \sin\omega IFt - \beta \cdot \sin\omega IFt$$

These signals SIFI and SIFQ are fed to the phase-shift circuits 13I and 13Q, and as described earlier, the phase of the signal SIFQ is delayed by 90° relative to that of the signal SIFI, so that:

$$SIFI = \alpha \cdot \cos\omega IFt + \beta \cdot \cos\omega IFt \quad (5)$$

$$SIFQ = \alpha \cdot \sin(\omega IFt - 90°) - \beta \cdot \sin(\omega IFt - 90°) \quad (6)$$
$$= -\alpha \cdot \cos\omega IFt + \beta \cdot \cos\omega IFt$$

Thus, between the signal SIFI and the signal SIFQ, the signal components α·cos ωIFt of are in mutually opposite phases, while the signal components β·cos ωIFt are in phase with each other.

These signals SIFI and SIFQ are fed to the adder-subtractor circuit 14. In this case, a signal of a desired segment is received by the lower heterodyne system. Thus, the adder-subtractor circuit 14 performs subtraction, outputting a signal SIF expressed as follows:

$$SIF = SIFI - SIFQ$$
$$= 2\alpha \cdot \cos\omega IFt$$
$$= ELO \cdot ERX \cdot \cos\omega IFt$$

The output signal SIF is an intermediate frequency signal obtained when the signal SRX is received by the lower heterodyne system.

The intermediate frequency signal SIF is output from the IC 10 after passing the signal line running through the bandpass filter 15, the AGC amplifier 16, and the low-pass filter 17, and then fed to the demodulation circuit 44, which demodulates a digital audio signal of a target program.

Figure 3:
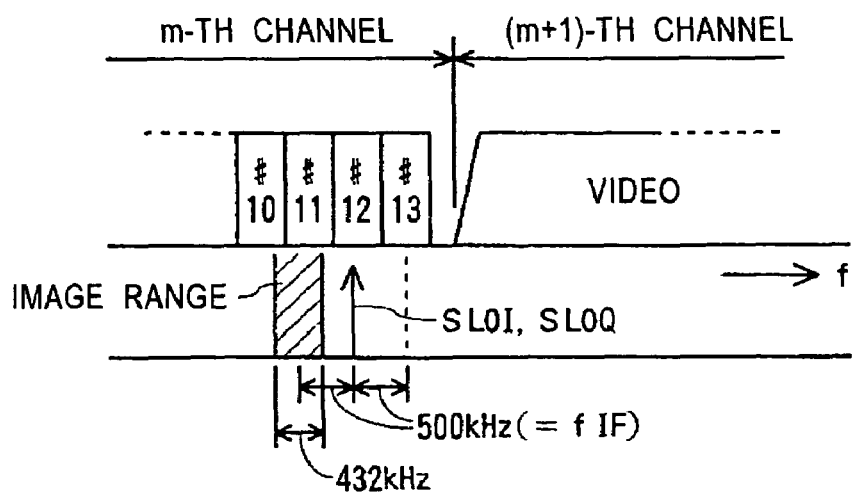
FIG. 3 is a frequency spectrum chart for explaining the present invention.

In this case, for example, when a signal of the segment #13 is received, as shown in FIG. 3, part of the segments #10 and #11 becomes the image interference signal SUD. However, as described earlier, if a digital signal (e.g., a signal of a segment) becomes as an image interference signal, an image interference rejection ratio of 28 dB or larger is sufficient to normally receive a signal of a desired segment without a problem. An image interference rejection ratio on the order of 28 dB is feasible. Thus, in the case shown in FIG. 3, the signal of the segment #13 is received without a problem.

In particular, in the case of ISDB-TSB, the reception levels of the segments #1 to #13 in the same channel are substantially the same, and the ratio of the reception level of a desired segment to the reception level of a segment that causes image interference is substantially the same regardless of reception status, so that a large image interference rejection ratio is not required.

This similarly applies to cases where signals of other segments are received. That is, when a signal of a segment is received, if an analog signal falls within a range of image frequencies assuming reception by the upper heterodyne system, the lower heterodyne system is used for reception.

During reception by the upper heterodyne system and during reception by the lower heterodyne system, the frequency spectrum of the intermediate frequency signal SIF fed to the demodulation circuit 44 is reverse. Thus, although not shown, the control signal SUL is fed to the demodulation circuit 44 as information indicating the heterodyne system.

Thus, the reception circuit shown in FIG. 1 is allowed to receive a signal of any segment of ISDB-TSB broadcasting. Since the heterodyne system is switched so that an analog signal will not fall within a range of image frequencies, an image interference rejection ratio on the order of 28 dB is sufficient to favorably receive a signal of a target segment. Thus, precision of parts and circuits of the IC 10 need not be enhanced compared with before, and special parts need not be added.

Furthermore, since the intermediate frequency of the intermediate frequency signal SIF is as low as, for example, 500 kHz, even if the demodulation circuit 44 executes demodulation in digital, for example, as shown in FIG. 1, single conversion suffices for reception, serving to simplify the arrangement and to reduce the number-of parts.

Switching of the heterodyne system between the upper heterodyne system and the lower heterodyne system in accordance with a segment to be received can be executed as follows.

When a signal of a segment is received by the upper heterodyne system, the signals SIFI and SIFQ output from the phase-shift circuits 13I and 13Q can be expressed by equations (3) and (4), and these signals SIFI and SIFQ are added by the adder-subtractor circuit 14 to yield the intermediate frequency signal SIF. However, if the adder-subtractor 14 performs subtraction at this time, the signal yielded will be:

$$SIF = SIFI - SIFQ$$
$$= 2\beta \cdot \cos\omega IFt$$
$$= ELO \cdot EUD \cdot \cos\omega IFt$$

The signal SIF yielded is an image interference signal that occurs when the signal SRX is received by the upper heterodyne system.

When the signal of that segment is received by the lower heterodyne system, the signals SIFI and SIFQ output from the phase-shift circuits 13I and 13Q can be expressed by equations (5) and (6), and the adder-subtractor circuit 14 performs subtraction with the signals SIFI and SIFQ to yield the intermediate frequency signal SIF. If the adder-subtractor circuit 14 performs addition at this time, the signal yielded will be:

$$SIF = SIFI - SIFQ$$
$$= 2\beta \cdot \cos\omega IFt$$
$$= ELO \cdot EUD \cdot \cos\omega IFt$$

The signal SIF yielded is an image interference signal that occurs when the signal SRX is received by the lower heterodyne system.

That is, in the reception circuit shown in FIG. 1, when addition and subtraction in the adder-subtractor circuit 14 are reversed, the image interference signal SUD is received instead of the desired reception signal SRX of the target segment.

Thus, in the reception circuit shown in FIG. 1, the intermediate frequency signal SIF from the low-pass filter 17 is fed to a level detection circuit 37 to detect the reception level of a signal being received (the desired reception signal SRX of the segment or the image interference signal SUD), and a resulting detection signal is fed to the microcomputer 46.

Figure 4:
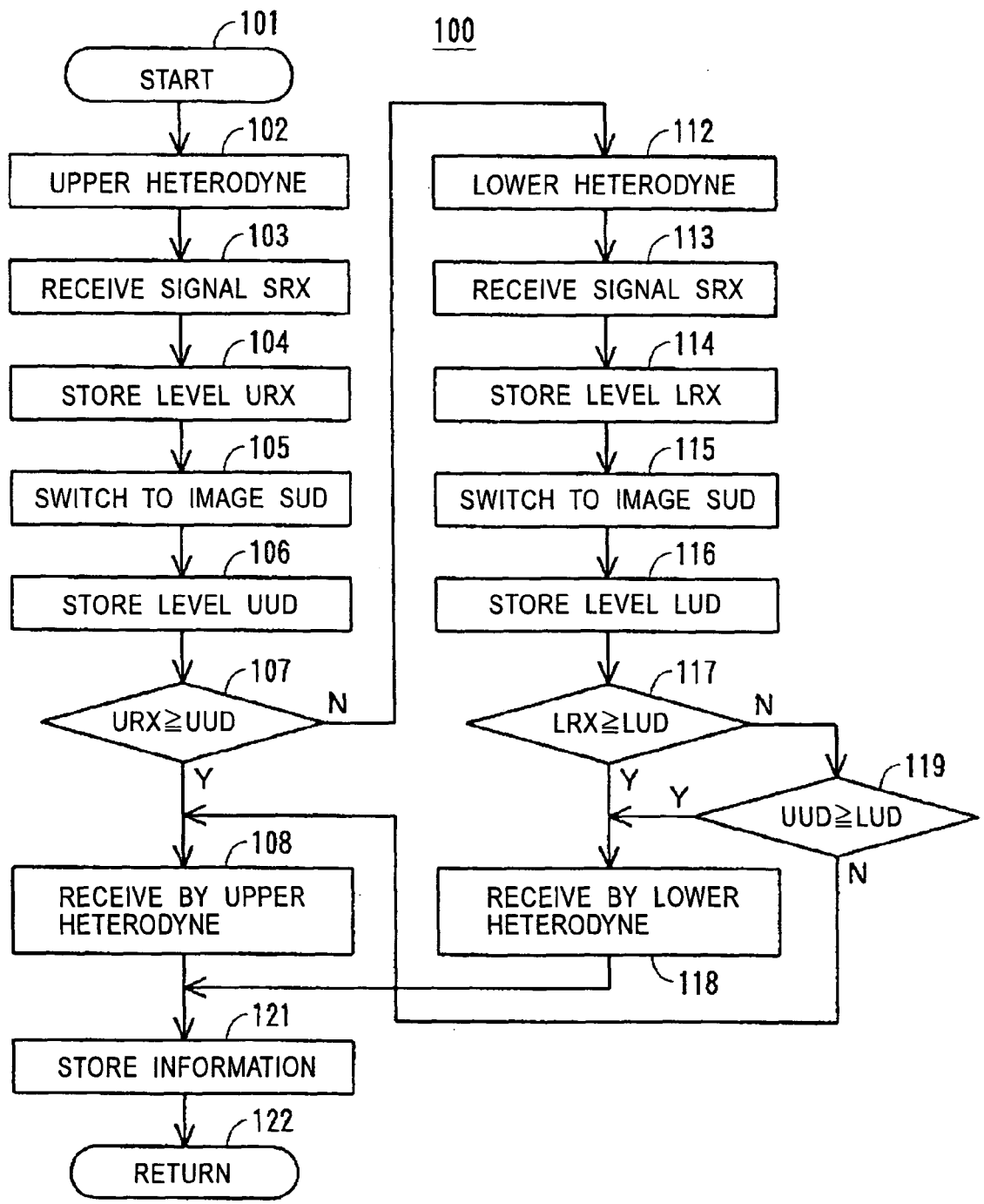
FIG. 4 is a flowchart showing an embodiment of the present invention.

The microcomputer 46 is provided with an automatic setting routine 100 for setting of the heterodyne system, for example, as shown in FIG. 4, as part of a program to be executed by a CPU (central processing unit) (not shown) thereof. The routine 100 is executed as follows. The CPU starts processing in step 101 of the routine 100. Then, in step 102, the heterodyne system is set to the upper heterodyne system. This setting is done by controlling the adder-subtractor circuit 14 so that the adder-subtractor circuit 14 will perform addition.

Then, in step 103, the frequency division ratio N of the variable frequency-divider circuit 22 is set to a specified value to receive a signal SRX of a target segment by the upper heterodyne system. Accordingly, the adder-subtractor circuit 14 outputs an intermediate frequency signal SIF of the signal SRX of the target segment. Then, in step 104, a reception level indicated at this time by the detection circuit 37, i.e., a reception level URX of the signal SRX of the segment, is stored in a memory (not shown) of the microcomputer 46.

Then, in step 105, the adder-subtractor circuit 14 is controlled so that subtraction will be performed. Thus, the adder-subtractor circuit 14 outputs an intermediate frequency signal SIF of the image interference signal SUD. Then, in step 106, a detection level indicated at this time by the detection circuit 37, i.e., a reception level UUD of the image interference signal SUD selected in step 105, is stored in the memory of the microcomputer 46.

Then, in step 107, the reception levels URX and UUD stored in steps 104 and 106 are compared with each other. If URX≧UUD, the signal of the target segment can be received by the upper heterodyne system without image interference. Thus, the routine proceeds from step S107 to step S108, in which the signal of the target segment is received by the upper heterodyne system.

Then, in step 121, information required for obtaining the current reception status, including information for identifying the segment being received, the control signal SUL, the frequency division ratio N of the variable frequency-divider circuit 22, and the control signal SCH for switching of the switching circuits 31, 32I, and 32Q, is stored in the memory of the microcomputer 46. Then, the routine 100 is exited in step 122.

On the other hand, if URX<UUD in step 107, image interference could occur if the signal of the target segment is received by the upper heterodyne system. Thus, the routine proceeds from step 107 to step 112, in which the heterodyne system is set to the lower heterodyne system.

Then, in step 113, the signal SRX of the target segment is received by the lower heterodyne system, and the adder-subtractor circuit 14 outputs an intermediate frequency signal SIF of the signal SRX of the target segment. Then, in step 114, a reception level LRX of the signal SRX, indicated by the detection circuit 37, is stored in the memory of the microcomputer 46. Then, in step 115, the adder-subtractor circuit 14 is controlled so that addition will be performed. Thus, the adder-subtractor circuit 14 outputs an intermediate frequency signal SIF of the image interference signal SUD. Then, in step 116, a reception level LUD of the image interference signal SUD is stored in the memory of the microcomputer 46.

Then, in step 117, the reception levels LRX and LUD stored in steps 114 and 106 are compared with each other. If LRX≧LUD, the signal of the target segment can be received by the lower heterodyne system without image interference. Thus, the routine proceeds from step 117 to step 118, in which the signal of the target segment is received by the lower heterodyne system. Then, the routine proceeds to step 121, in which information required for obtaining the current reception status is stored in the memory of the microcomputer 46. Then, the routine 100 is exited in step 122.

If LRX<LUD in step 117, image interference could occur if the signal of the target signal is received by the lower heterodyne system. Thus, the routine proceeds from step 117 to step 119, in which the reception levels UUD and LUD of the image interference signal, stored in steps 106 and 116, are compared with each other. If UUD≧LUD, the level of the image interference signal SUD is smaller if the lower heterodyne system is used for reception compared with a case where the upper heterodyne system is used for reception. Thus, the routine proceeds from step 119 to step 118, in which the signal of the target segment is received by the lower heterodyne system. Then, steps 121 and 122 are executed.

If UUD<LUD in step 119, the level of the image interference signal SUD is smaller if the upper heterodyne system is used for reception compared with a case where the lower heterodyne system is used for reception. Thus, the routine proceeds from step 119 to step 108, in which the signal of the target segment is received by the upper heterodyne system. Then, steps 121 and 122 are executed.

Thus, in the routine 100, when receiving a signal of a target segment, the upper heterodyne system is used for reception by default; however, the lower heterodyne system is used for reception if image interference will be alleviated by using the lower heterodyne system. Accordingly, the routine 100 constantly allows the signal of the target segment to be appropriately received by automatically switching the heterodyne system. Furthermore, the routine 100 works appropriately even if a channel adjacent to a channel used for ISDB-TSB broadcasting is used for television broadcasting, is a vacant channel, or is used for broadcasting or transmission of another signal.

If the routine 100 is used on a receiver installed and used at home or at an office and thus having fixed reception conditions, the routine 100 is executed when a segment that has not been received in the past is received for the first time, while information stored in step 121 is used for reception when receiving a segment that has been received in the past. If the routine 100 is used on a receiver mounted and used on a vehicle and thus having varying reception conditions, the routine 100 is executed each time when reception of a segment is requested.

Figure 5:
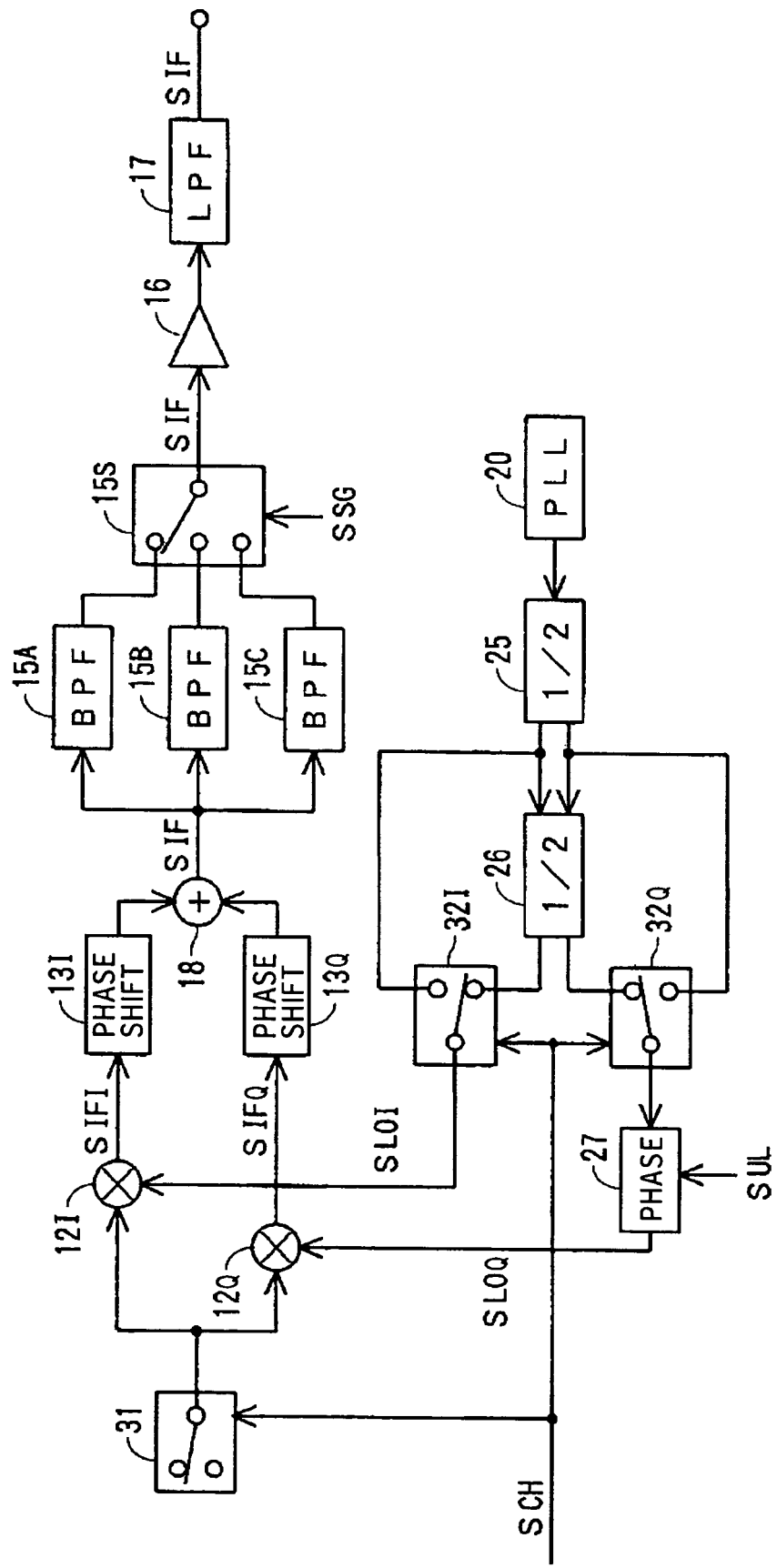
FIG. 5 is system diagram showing part of another embodiment of the present invention.

FIG. 5 shows another embodiment of the present invention. In this embodiment, three continuous segments in the same channel are simultaneously received and one of the segments is used. Furthermore, in this embodiment, the phase of the local oscillation signal SLOQ is normally rotated or reversely rotated between reception by the upper heterodyne system and reception by the lower heterodyne system, and the adder-subtractor circuit 14 shown in FIG. 1 is fixed as an adder circuit.

Figure 6A:
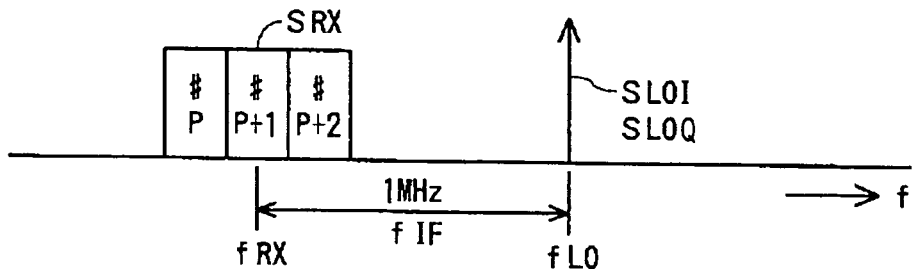
FIGS. 6A to 6D are frequency spectrum charts for explaining the present invention.
Figure 6B:
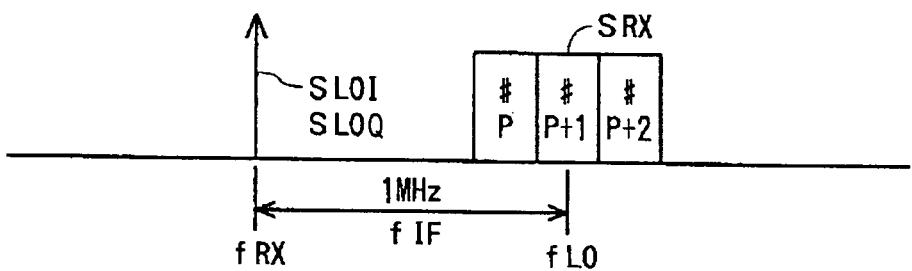

In the following description, for example, as shown in FIG. 6A (a case of the upper heterodyne system) and FIG. 6B (a case of the lower heterodyne system), the reception frequency fRX is the center frequency of three continuous segments #P to #(P+2). The intermediate frequency fIF is 1 MHz.

In the reception circuit shown in FIG. 5, a phase switching circuit 27 is provided on the signal line between the switching circuit 32Q and the mixer circuit 12Q, and the control signal SUL is fed to the phase switching circuit 27. Switching of the phase of the local oscillation signal SLOQ fed to the mixer circuit 12Q is controlled so that:

$SLOQ=+ELO\cdot\cos \omega LOt$ in the case of the upper heterodyne system $SLOQ=-ELO\cdot\cos \omega LOt$ in the case of the lower heterodyne system The phase of the local oscillation signal SLOI is, as described earlier:

$SLOI=ELO\cdot\sin \omega LOt$ and it is fixed.

Furthermore, an adder circuit 18 is provided instead of the adder-subtractor circuit 14 shown in FIG. 1, and the signals SIFI and SIFQ output from the phase-shift circuits 13I and 13Q are fed to the adder circuit 18. In this case, the phase-shift circuits 13I and 13Q, and the adder circuit 18 can be implemented by polyphase filters.

Thus, when signals of the segments #P to #(P+2) are received by the upper heterodyne system, the arrangement is similar to that of the reception circuit shown in FIG. 1. Accordingly, the adder circuit 18 outputs an intermediate frequency signal SIF obtained when the signals of the segments #P to #(P+2) are received by the upper heterodyne system.

On the other hand, if the signals of the segments #P to #(P+2) are received by the lower heterodyne system, compared with the case where the upper heterodyne system is used for reception, the phase of the local oscillation signal SLOQ is reversed, and due to this phase reversal, the phase of the signal SIFQ is also reversed. The reversal of the phase of the signal SIFQ is equivalent to subtraction in the adder circuit 18. Thus, similarly to the reception circuit shown in FIG. 1, the adder circuit 18 outputs an intermediate frequency signal SIF obtained when the signals of the segments #P to #(P+2) are received by the lower heterodyne system.

Figure 6C:
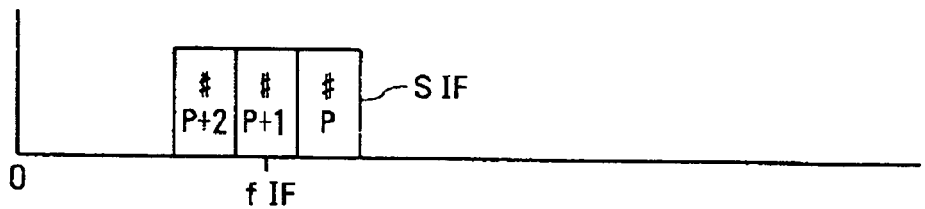
Figure 6D:
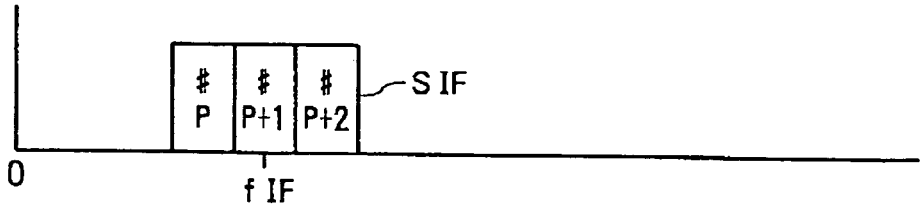

Between the intermediate frequency signal SIF obtained by the upper heterodyne system (FIG. 6C) and the intermediate frequency signal SIF obtained by the lower heterodyne system (FIG. 6D), as shown in FIGS. 6C and 6D, the frequency positions of the segments #P to #(P+2) are reverse.

The intermediate frequency signal SIF yielded as described above is fed to intermediate-frequency bandpass filters 15A to 15C. In this case, the bandpass filter 15A has bandpass characteristics of passing the intermediate frequency signal SIF of the segment #(P+2), obtained by the upper heterodyne system, and the intermediate frequency signal SIF of the segment #P, obtained by the lower heterodyne system.

The bandpass filter 15B has bandpass characteristics of passing the intermediate frequency signals SIF of the segment #(P+1), obtained by the upper heterodyne system and the lower heterodyne system. The bandpass filter 15C has bandpass characteristics of passing the intermediate frequency signal SIF of the segment #P, obtained by the upper heterodyne system, and the intermediate frequency signal SIF of the segment #(P+2), obtained by the lower heterodyne system.

Signals output from these bandpass filters 15A to 15C are fed to a switching circuit 15S, and switching of the switching circuit is controlled according to a control signal SSG from the microcomputer 46 in accordance with a target segment.

Thus, the switching circuit 15S outputs an intermediate frequency signal SIF of a target segment among the three segments #P to #(P+2) received, and the signal SIF is output from the IC 10 after passing the amplifier 16 and the low-pass filter 17. Also in this reception circuit, the frequency spectrum of the intermediate frequency signal SIF fed to the demodulation circuit 44 is reverse between reception by the upper heterodyne system and reception by the lower heterodyne system. Thus, although not shown, the control signal SUL is fed to the demodulation circuit 44 as information indicating the heterodyne system.

Accordingly, this reception circuit is also allowed to receive a signal of any segment, and to favorably receive a signal of a target segment if a certain degree of image interference rejection ratio is provided. Accordingly, precision of parts and circuits of the IC 10 need not be enhanced compared with before, and special parts need not be added.

Furthermore, although the bandwidth of the three continuous segments #P to #(P+2) is 1,296 MHz (432 kHz×3), and a large bandwidth is required for reception thereof, the intermediate frequency fIF is allowed to be as low as, for example, 1 MHz. Furthermore, in this reception circuit, when the heterodyne system is switched between the upper heterodyne system and the lower heterodyne system, it suffices to shift the local oscillation frequency fLO and to normally rotate or reversely rotate the phase of the local oscillation signal SLOQ by the phase switching circuit 27.

Furthermore, the phase-shift circuits 13I and 13Q and the adder circuit 18 can be implemented by polyphase filters, allowing improvement in the phase characteristics of the signals SIFI and ±SIFQ.

Figure 7:
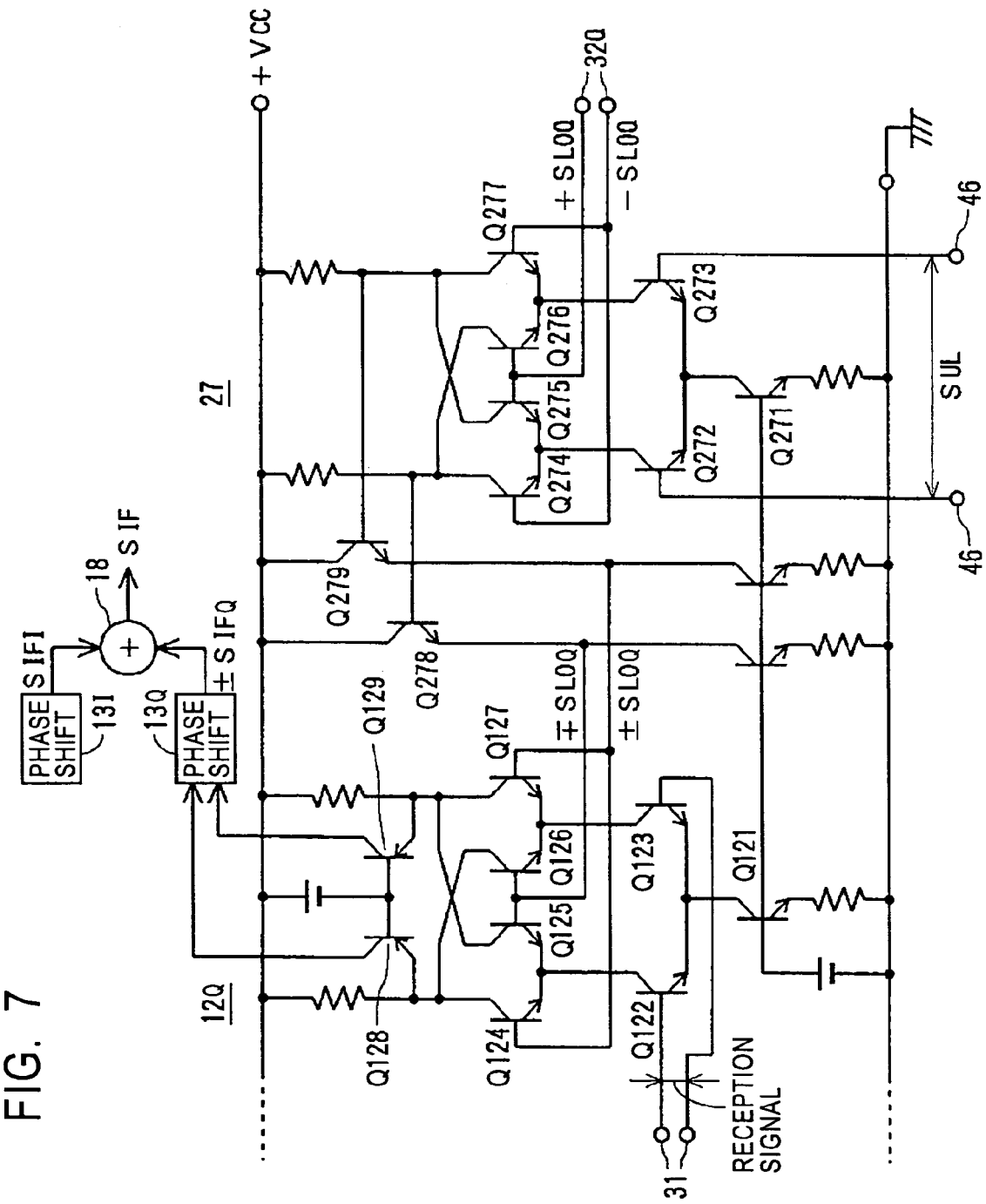
FIG. 7 is a connection diagram showing part of another embodiment of the present invention.

FIG. 7 shows an example of the mixer circuit 12Q and the phase switching circuit shown in FIG. 5. The mixer circuit 12Q is implemented by transistors Q121 to Q127 in a double balanced arrangement, and common-base transistors Q128 and Q129 are connected as an output circuit thereof. A reception signal (SRX+SUD) from the switching circuit 31 is fed to the transistors Q122 and Q123. At this time, the reception signal is fed in the form of balanced signals.

The phase switching circuit 27 is implemented by transistors Q271 to Q277 in a double balanced arrangement. A local oscillation signal of one phase +SLOQ is fed to the transistors Q275 and Q276, and a local oscillation signal of the other phase (opposite phase) −SLOQ is fed to the transistors Q274 and Q277. Furthermore, the control signal SUL is fed to the transistors Q272 and Q273 in the form of balanced signals.

In accordance with the control signal SUL, when the transistor Q272 is on and the transistor Q273 is off, the transistors Q274 and Q275 are turned on and the transistors Q276 and Q277 are turned off. Thus, the local oscillation signal +SLOQ is fed to the transistors Q124 and Q127 via the transistor Q275 and an emitter-follower transistor Q279. Furthermore, the local oscillation signal −SLOQ is fed to the transistors Q125 and Q126 via the transistor Q274 and an emitter-follower transistor Q278.

On the other hand, in accordance with the control signal SUL, when the transistor Q273 is on and the transistor Q272 is off, the transistors Q276 and Q277 are turned on and the transistors Q274 and Q275 are turned off. Thus, the local oscillation signal +SLOQ is fed to the transistors Q125 and Q126 via the transistor Q276 and the transistor Q278. Furthermore, the local oscillation signal −SLOQ is fed to the transistors Q124 and Q127 via the transistor Q277 and the transistor Q279.

Thus, the phase of the local oscillation signal fed to the mixer circuit 12Q is normally rotated or reversely rotated in accordance with the control signal SUL, so that the mixer circuit 12Q outputs a signal SIFQ or a signal −SIFQ. The signal ±SIFQ is fed to the adder circuit 18, so that the adder circuit 18 outputs an intermediate frequency signal SIF by the upper heterodyne system or the lower heterodyne system.

Figure 8:
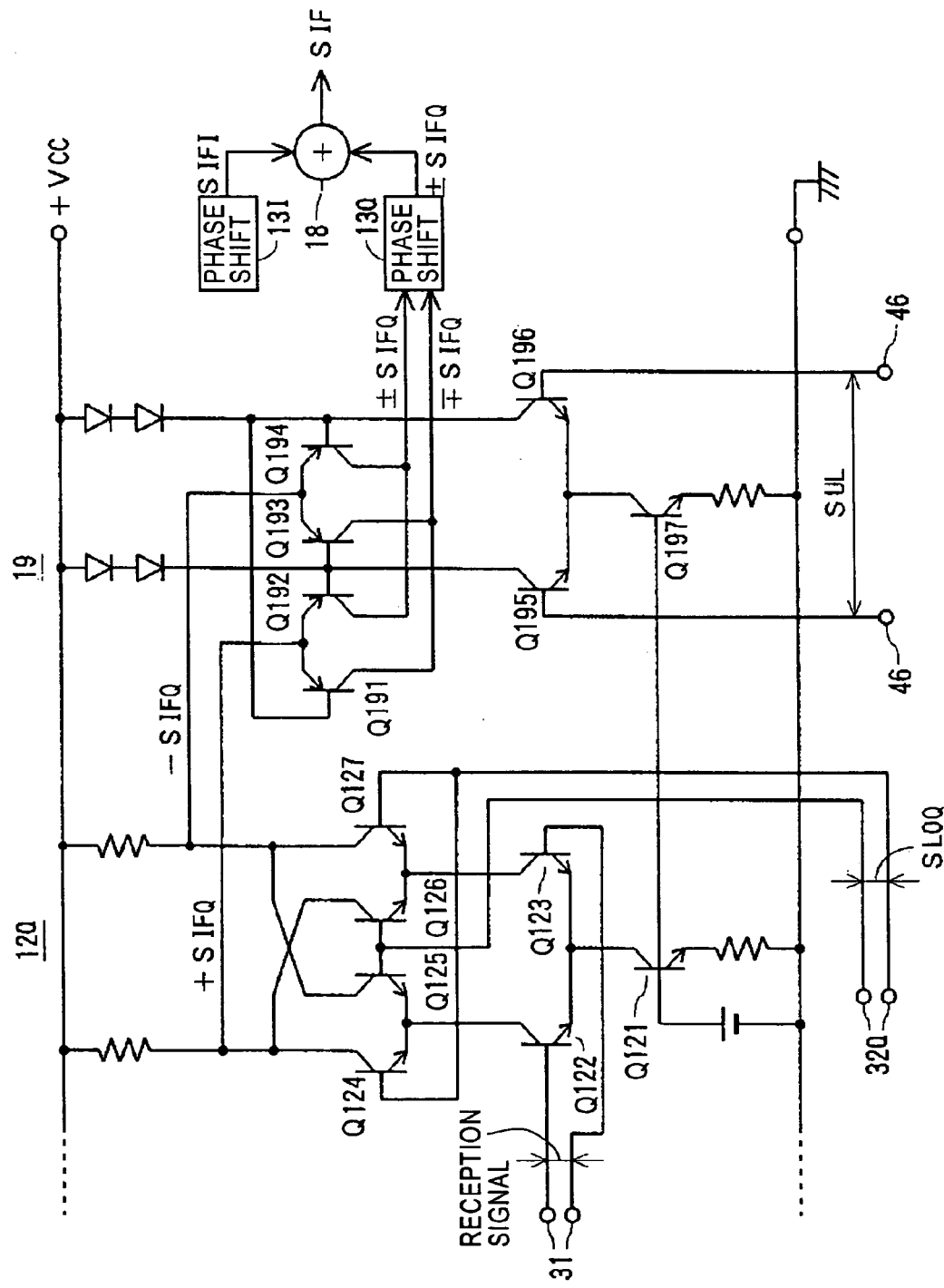
FIG. 8 is a connection diagram showing part of another embodiment of the present invention.

In FIG. 8, the phase of the intermediate frequency signal SIFI is fixed irrespective of the heterodyne system, and the phase of the intermediate frequency signal SIFQ itself is normally rotated or reversely rotated in accordance with the heterodyne system.

More specifically, the mixer circuit 12Q is implemented in a double balanced arrangement, as described earlier with reference to FIG. 7. A reception signal (SRX+SUD) from the switching circuit 31 is fed to the transistors Q122 and Q123, and the local oscillation signal SLOQ from the switching circuit 32Q is fed to the transistors Q124 and Q127 and Q125 and Q126. At this time, the reception signal and the local oscillation signal SLOQ are fed in the form of balanced signals. Thus, the transistors Q124 and Q126 output the intermediate frequency signal +SIFQ, and the transistors Q125 and Q127 output the intermediate frequency signal −SIFQ.

Then, the intermediate frequency signals ±SIFQ are fed to a phase switching circuit 19. The phase switching circuit 19 is implemented by transistors Q191 to Q197 in a balanced arrangement. The phase switching circuit 19 normally rotates or reversely rotates the intermediate frequency signals ±SIFQ in accordance with the control signal SUL, and supplies the result to the phase-shift circuit 13Q.

That is, in accordance with the control signal SUL, when the transistor Q195 is on and the transistor Q196 is off, the transistors Q192 and Q193 are turned on and the transistors Q191 and Q194 are turned off. Thus, the intermediate frequency signal +SIFQ output from the transistors Q124 and Q126 is fed to a first balanced input terminal of the phase-shift circuit 13Q via the transistor Q192. Furthermore, the intermediate frequency signal −SIFQ output from the transistors Q125 and Q127 is fed to a second balanced input terminal of the phase-shift circuit 13Q via the transistor Q193.

On the other hand, in accordance with the control signal SUL, when the transistor Q196 is on and the transistor Q195 is off, the transistors Q191 and Q194 are turned on and the transistors Q192 and Q193 are turned off. Thus, the intermediate frequency signal +SIFQ output from the transistors Q124 and Q126 is fed to the second balanced input terminal of the phase-shift circuit 13Q via the transistor Q191. Furthermore, the intermediate frequency signal −SIFQ output from the transistors Q125 and Q127 is fed to the first balanced input terminal of the phase-shift circuit 13Q via the transistor Q194.

Thus, the phase of the intermediate frequency signal SIFQ fed to the phase-shift circuit 13Q is normally rotated or reversely rotated in accordance with the control signal SUL, so that the adder circuit 18 outputs an intermediate frequency signal SIF by the upper heterodyne system or the lower heterodyne system.

The routine 100 shown in FIG. 4 may be such that steps 113, 114, and 117 are omitted so that step 115 will be executed next to step 112 and so that step 119 will be executed next to step 116.

Furthermore, since it is possible to know in advance whether a range of image frequencies will be higher than the frequencies of the m-th channel when a signal of a segment in the m-th channel is received by the upper heterodyne system, a data table defining association between segments and heterodyne systems (whether the upper heterodyne system or the lower heterodyne system) may be provided in the microcomputer 46 so that the heterodyne system can be determined based on the data table.

Furthermore, in the circuit shown in FIG. 8, even though the phase of the intermediate frequency signal SIFI is fixed, favorable balance of the phase, etc. can be achieved by supplying the intermediate frequency signal SIFI output from the mixer circuit 12I to the phase-shift circuit 13I via a switching circuit configured similarly to the phase switching circuit 19 and by fixing the switching circuit.

Although it has been described above that a signal of a target segment is received by the upper heterodyne system by default, the arrangement may be such that the lower heterodyne system is used for reception by default while using the upper heterodyne system for reception if the upper heterodyne system serves to alleviate image interference.

Although the present invention has been described hereinabove in the context of a receiver for ISDB-TSB broadcasting, the present invention can be applied to a receiver with a low intermediate frequency fIF, such as a receiver for FM broadcasting or shortwave broadcasting. In that case, adequate image rejection characteristics are achieved even if antenna tuning characteristics are broad.

According to the present invention, the effect of image interference can eliminated without using special parts. Furthermore, precision of parts and circuits need not be enhanced compared with before. Furthermore, a low intermediate frequency is allowed, so that single conversion is allowed in reception even if demodulation is executed in digital, serving to simplify the arrangement and to reduce the number of parts.

The invention claimed is:

1. A heterodyne receiver comprising:
a first reception circuit arranged to be an upper heterodyne system that passes a first upper frequency signal within a first upper frequency range and at least partially rejects a first lower frequency signal within a first lower frequency range as a first image signal, the first reception circuit providing the first upper frequency signal at an output of the first reception circuit;
a second reception circuit arranged to be a lower heterodyne system that passes a second lower frequency signal within a second lower frequency range and at least partially rejects a second upper frequency signal within a second upper frequency range as a second image signal, the second reception circuit providing the second lower frequency signal at an output of the second reception circuit;
a selection circuit for selecting and outputting one of the output signals of the first and second reception circuits; and
a control circuit for controlling the selection circuit so that a reception circuit with less image interference in the output signals of the first and second reception circuits is selected; wherein a local oscillation frequency of the heterodyne receiver is changed when the selection circuit selects and outputs a different one of the output signals of the first and second reception circuits, such that the first upper frequency range and the second lower frequency range are substantially the same;
wherein the first and second reception circuits receive one or more signals transmitted in one or more OFDM segments,
wherein the control circuit controls the selection circuit so that an image frequency in a reception circuit falls within a range of another OFDM segment transmitted in conjunction with the one or more OFDM segments, and,
wherein the one or more signals received by the first and second reception circuits are one or more ISDB-TSB broadcasting signals.

2. A heterodyne receiver according to claim 1,
wherein the control circuit comprises a detection circuit for detecting at least a level of an image interference signal in the output signals of the first and second reception circuits, and
wherein the control circuit controls the selection circuit in accordance with a detection output of the detection circuit so that a reception circuit with less image interference is selected.

3. A heterodyne receiver comprising:
a reception circuit that can be selectively switched into an upper heterodyne system or a lower heterodyne system; and
a control circuit for controlling the reception circuit to switch the reception circuit into the upper heterodyne system and the lower heterodyne system in turn and to then switch the reception circuit into a system with less image interference in output signals of the reception circuit in respective cases;
wherein, when the reception circuit is configured to be an upper heterodyne system, the reception circuit passes a first upper frequency signal within a first upper frequency range and at least partially rejects a first lower frequency signal within a first lower frequency range as a first image signal, the first reception circuit providing the first upper frequency signal at an output of the first reception circuit;
wherein, when the reception circuit is configured to be a lower heterodyne system, the reception circuit passes a second lower frequency signal within a second lower frequency range and at least partially rejects a second upper frequency signal within a second upper frequency range as a second image signal, the second reception circuit providing the second lower frequency signal at an output of the second reception circuit;
wherein the control circuit adjusts an oscillation frequency of the heterodyne receiver upon switching of the reception circuit, such that the first upper frequency range and the second lower frequency range are substantially the same;
wherein the reception circuit receives one or more signals transmitted in one or more OFDM segments,
wherein the control circuit controls the reception circuit so that an image frequency in the reception circuit falls within a range of another OFDM segment transmitted in conjunction with the one or more OFDM segments, and,
wherein the one or more signals received by the reception circuit are one or more ISDB-TSB broadcasting signals.

4. A heterodyne receiver according to claim 3,
wherein the control circuit comprises a detection circuit for detecting at least a level of an image interference signal in an output signal of the reception circuit,
and wherein the control circuit controls switching according to a detection output of the detection circuit so that a system with less image interference is selected.

5. A heterodyne receiver comprising:
a reception circuit that can be selectively switched into an upper heterodyne system or a lower heterodyne system; and
a control circuit for controlling the reception circuit to switch the reception circuit into the upper heterodyne system and the lower heterodyne system in turn and to then switch the reception circuit into a system with less image interference in output signals of the reception circuit in respective cases;

wherein, when the reception circuit is configured to be an upper heterodyne system, the reception circuit passes a first upper frequency signal within a first upper frequency range and at least partially rejects a first lower frequency signal within a first lower frequency range as a first image signal, the first reception circuit providing the first upper frequency signal at an output of the first reception circuit;

wherein, when the reception circuit is configured to be a lower heterodyne system, the reception circuit passes a second lower frequency signal within a second lower frequency range and at least partially rejects a second upper frequency signal within a second upper frequency range as a second image signal, the second reception circuit providing the second lower frequency signal at an output of the second reception circuit;

wherein the control circuit adjusts an oscillation frequency of the heterodyne receiver upon switching of the reception circuit, such that the first upper frequency range and the second lower frequency range are substantially the same;

wherein the reception circuit comprises:
a circuit for forming a pair of local oscillation signals having phases different by 90° relative to each other,
a pair of mixer circuits for frequency-converting a received signal into intermediate frequency signals using the pair of local oscillation signals, respectively,
a pair of phase-shift circuits having a phase difference of 90° relative to each other, to which output signals of the pair of mixer circuits are fed, respectively, and
an operation circuit to which output signals of the pair of phase-shift circuits are fed; and wherein a local oscillation frequency of the pair of local oscillation signals is shifted by twice an intermediate frequency and an operation in the operation circuit is switched into addition or subtraction to thereby switch the reception circuit into the upper heterodyne system or the lower heterodyne system.

6. A heterodyne receiver comprising:
a reception circuit that can be selectively switched into an upper heterodyne system or a lower heterodyne system; and
a control circuit for controlling the reception circuit to switch the reception circuit into the upper heterodyne system and the lower heterodyne system in turn and to then switch the reception circuit into a system with less image interference in output signals of the reception circuit in respective cases;

wherein, when the reception circuit is configured to be an upper heterodyne system, the reception circuit passes a first upper frequency signal within a first upper frequency range and at least partially rejects a first lower frequency signal within a first lower frequency range as a first image signal, the first reception circuit providing the first upper frequency signal at an output of the first reception circuit;

wherein, when the reception circuit is configured to be a lower heterodyne system, the reception circuit passes a second lower frequency signal within a second lower frequency range and at least partially rejects a second upper frequency signal within a second upper frequency range as a second image signal, the second reception circuit providing the second lower frequency signal at an output of the second reception circuit;

wherein the control circuit adjusts an oscillation frequency of the heterodyne receiver upon switching of the reception circuit, such that the first upper frequency range and the second lower frequency range are substantially the same;

wherein the reception circuit comprises;
a circuit for forming a pair of local oscillation signals having phases different by 90° relative to each other,
a phase switching circuit for reversing or not reversing the phase of a local oscillation signal of the pair of local oscillation signals,
a pair of mixer circuits for frequency-converting a received signal into intermediate frequency signals using a local oscillation signal output from the phase switching circuit and an other local oscillation signal of the pair of local oscillation signals, respectively,
a pair of phase-shift circuits having a phase difference of 90° relative to each other, to which output signals of the pair of mixer circuits are fed, respectively, and
an adder circuit to which output signals of the pair of phase-shift circuits are fed; and wherein the phase switching circuit switches the phase of the local oscillation signal to thereby switch the reception circuit between the upper heterodyne system and the lower heterodyne system.

7. A heterodyne receiver according to claim 6, wherein the pair of phase-shift circuits and the adder circuit are implemented by polyphase filters.

8. An integrated circuit for receiving a signal by a heterodyne system, the integrated circuit comprising;
a circuit for forming a pair of local oscillation signals having phases different by 90° relative to each other;
a pair of mixer circuits for frequency-converting a received signal into intermediate frequency signals using the pair of local oscillation signals, respectively;
a pair of phase-shift circuits having a phase difference of 90° relative to each other, to which output signals of the pair of mixer circuits are fed, respectively; and
an operation circuit to which output signals of the pair of phase-shift circuits are fed;

wherein an operation in the operation circuit is switched into addition or subtraction to thereby switch a reception circuit into an upper heterodyne system or a lower heterodyne system;

wherein, when the reception circuit is configured to be an upper heterodyne system, the reception circuit passes a first upper frequency signal within a first upper frequency range and at least partially rejects a first lower frequency signal within a first lower frequency range as a first image signal, the first reception circuit providing the first upper frequency signal at an output of the first reception circuit;

wherein, when the reception circuit is configured to be a lower heterodyne system, the reception circuit passes a second lower frequency signal within a second lower frequency range and at least partially rejects a second upper frequency signal within a second upper frequency range as a second image signal, the second reception circuit providing the second lower frequency signal at an output of the second reception circuit;

wherein a local oscillation frequency of the pair of local oscillation signals is shifted by twice an intermediate frequency upon switching the operation circuit into addition or subtraction, such that the first upper frequency range and the second lower frequency range are substantially the same.

9. The integrated circuit according to claim 8, further comprising;
a detection circuit for detecting at least a level of an image interference signal in an output signal of the operation circuit, wherein switching is controlled in accordance with a detection output of the detection circuit so that one of the upper heterodyne system and the lower heterodyne system with less image interference is selected.

* * * * *